US 8,495,186 B1

(12) United States Patent
Breau

(10) Patent No.: US 8,495,186 B1
(45) Date of Patent: Jul. 23, 2013

(54) MANAGING TERMINATION OF POINT-TO-POINT SESSIONS BETWEEN ELECTRONIC DEVICES

(75) Inventor: Jeremy Richard Breau, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 282 days.

(21) Appl. No.: 12/983,517

(22) Filed: Jan. 3, 2011

(51) Int. Cl.
  *G06F 15/177* (2006.01)
  *G06F 15/173* (2006.01)
(52) U.S. Cl.
  USPC .......................................... 709/222; 709/239
(58) Field of Classification Search
  USPC ................ 709/230–244, 220–229, 238, 239, 709/245; 455/436–442
  See application file for complete search history.

(56) References Cited

U.S. PATENT DOCUMENTS

| | | | |
|---|---|---|---|
| 2004/0013116 A1* | 1/2004 | Greis et al. | 370/392 |
| 2008/0151784 A1* | 6/2008 | Abrol et al. | 370/254 |
| 2008/0298301 A1* | 12/2008 | Bedekar et al. | 370/328 |
| 2009/0109878 A1* | 4/2009 | Liu et al. | 370/259 |

OTHER PUBLICATIONS

S. Gundavelli, K. Leung, V. Devarapalli, K. Chowdhury, and B. Patil. RFC 5213: Proxy Mobile IPv6, Aug. 2008.*
D. Johnson, C. Perkins, and J. Arkko. RFC 3775: Mobility Support in IPv6. Jun. 2004.*
Simpson, W. RFC 1661: The point-to-point protocol (PPP) Jul. 1994.*
RFC 2153, PPP Vendor Extensions, May 1997, all pages.
RFC 3344, IP Mobility Support for IPv4, Aug. 2002, all pages.
RFC 5213, Proxy Mobile IPv6, Aug. 2008, all pages.
RFC 5563, WiMAX Forum/3GPP2 Proxy Mobile IPv4, Feb. 2010, all pages.

* cited by examiner

*Primary Examiner* — Brendan Higa

(57) ABSTRACT

Proxy mobile IP provides mobility to a mobile device that is not equipped to perform client mobile IP by moving the mobile IP signaling responsibility from the mobile device into the network. A network element performs the mobile IP signaling on behalf of the mobile device. In one scenario, the mobile device establishes a PPP session with a foreign agent, with no mobile IP signaling on top of the PPP session. The foreign agent then performs mobile IP signaling with the mobile device's home agent to negotiate a proxy mobile IP session for the device. Once the session registration lifetime has been established by the foreign agent and the home agent, the foreign agent communicates the registration lifetime to the mobile device by way of a PPP vendor-specific packet.

9 Claims, 7 Drawing Sheets

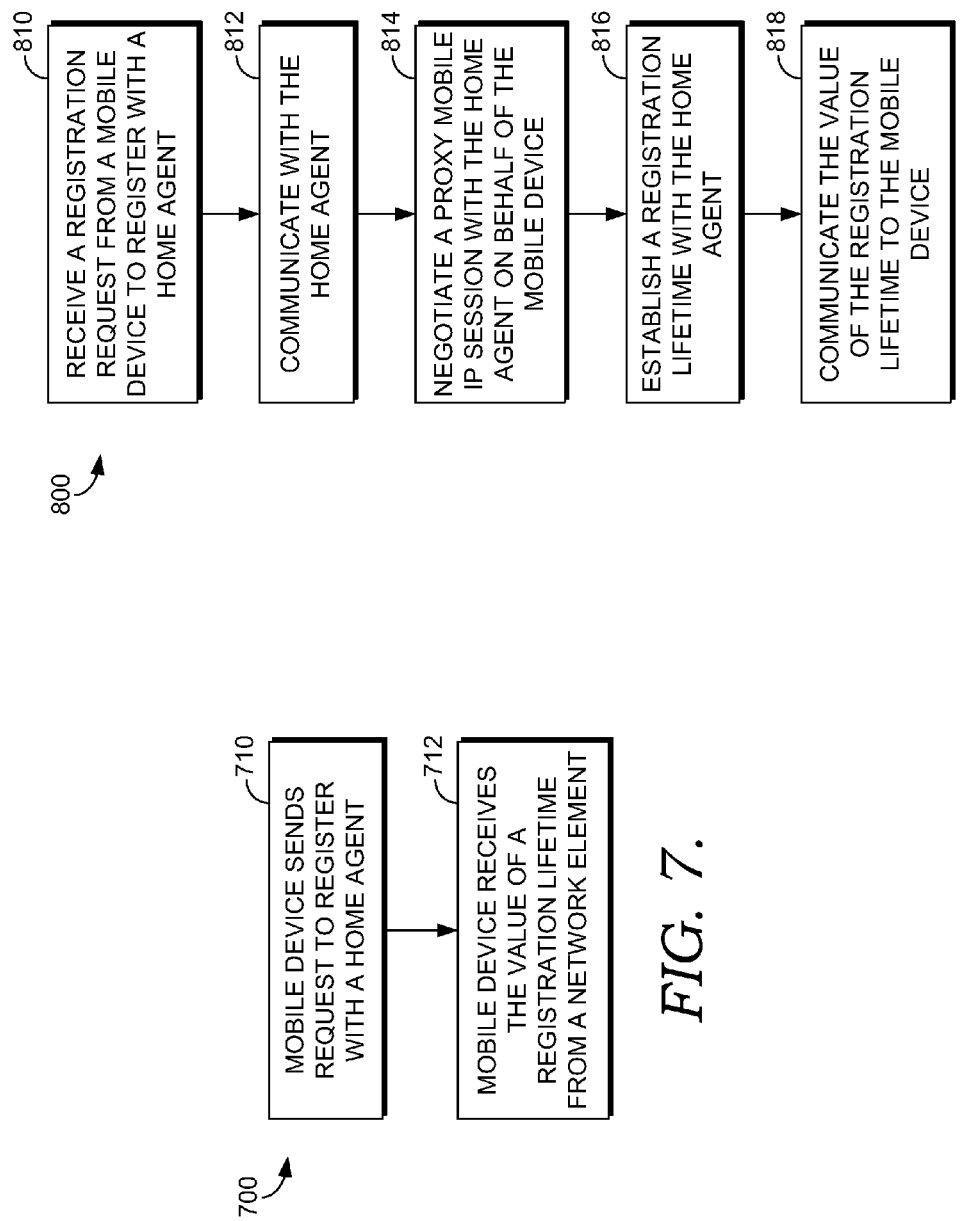

MANAGING TERMINATION OF POINT-TO-POINT SESSIONS BETWEEN ELECTRONIC DEVICES

CROSS REFERENCE TO RELATED APPLICATIONS

This application is related by subject matter to the invention disclosed in the following U.S. patent application filed on even date herewith: U.S. application Ser. No. 12/983,523, entitled "COMMUNICATING REREGISTRATION INFORMATION BASED ON THE LIFETIME OF A COMMUNICATION SESSION," which is assigned or under obligation of assignment to the same entity as this application.

SUMMARY

A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

In a first aspect, a set of computer-useable instructions provide a method of facilitating communication of a registration lifetime value to a mobile device for a proxy mobile Internet Protocol ("IP") session. The method includes sending a request, from the mobile device to register with its home agent. The request initiates a proxy mobile IP session, where a network element negotiates the proxy mobile IP session with the home agent on behalf of the mobile device. The network element and the home agent establish a value for the registration lifetime of the session. The mobile device receives the value of the registration lifetime from the network element.

In a second aspect, a method for facilitating communication of a registration lifetime value to a mobile device for a proxy mobile IP session is provided. The method includes receiving a registration request from the mobile device to register with its home agent, negotiating the proxy mobile IP session with the home agent on behalf of the mobile device, establishing the registration lifetime with the home agent, and communicating the value of the registration lifetime to the mobile device.

In a third aspect, a method for facilitating communication of a registration lifetime value to a mobile device for a proxy mobile IP session is provided. The method includes receiving a request from the mobile device to register with its home agent, communicating the request to the home agent, negotiating the proxy mobile IP session with the home agent on behalf of the mobile device, establishing the registration lifetime with the home agent, where establishing the registration lifetime includes determining the value of the registration lifetime, and communicating the value of the registration lifetime to the mobile device.

BRIEF DESCRIPTION OF THE SEVERAL VIEWS OF THE DRAWINGS

Illustrative embodiments of the present invention are described in detail below with reference to the attached drawing figures, and wherein:

FIG. 7 is a flowchart depicting a method for facilitating communication of a registration lifetime value to a mobile device for a proxy mobile IP session, in accordance with an embodiment of the present invention; and FIG. 8 is a flowchart depicting a method for facilitating communication of a registration lifetime value to a mobile device for a proxy mobile IP session, in accordance with an embodiment of the present invention.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| CDMA | Code Division Multiple Access |
| GPRS | General Packet Radio Service |
| GSM | Global System for Mobile Communications |
| IP | Internet Protocol |
| PDA | Personal Data Assistant |
| PDSN | Packet Data Serving Node |
| PPP | Point-to-Point Protocol |
| TDMA | Time Division Multiple Access |

Further, various technical terms are used throughout this description. An illustrative resource that fleshes out various aspects of these terms can be found in Newton's Telecom Dictionary, 25th Edition (2009).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network and computing devices. By way of example, and not limitation, computer-readable media include media implemented in any method or technology for storing information readable by a computing device. Examples of stored information include program modules including instructions, data structures, other data representations, and the like. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
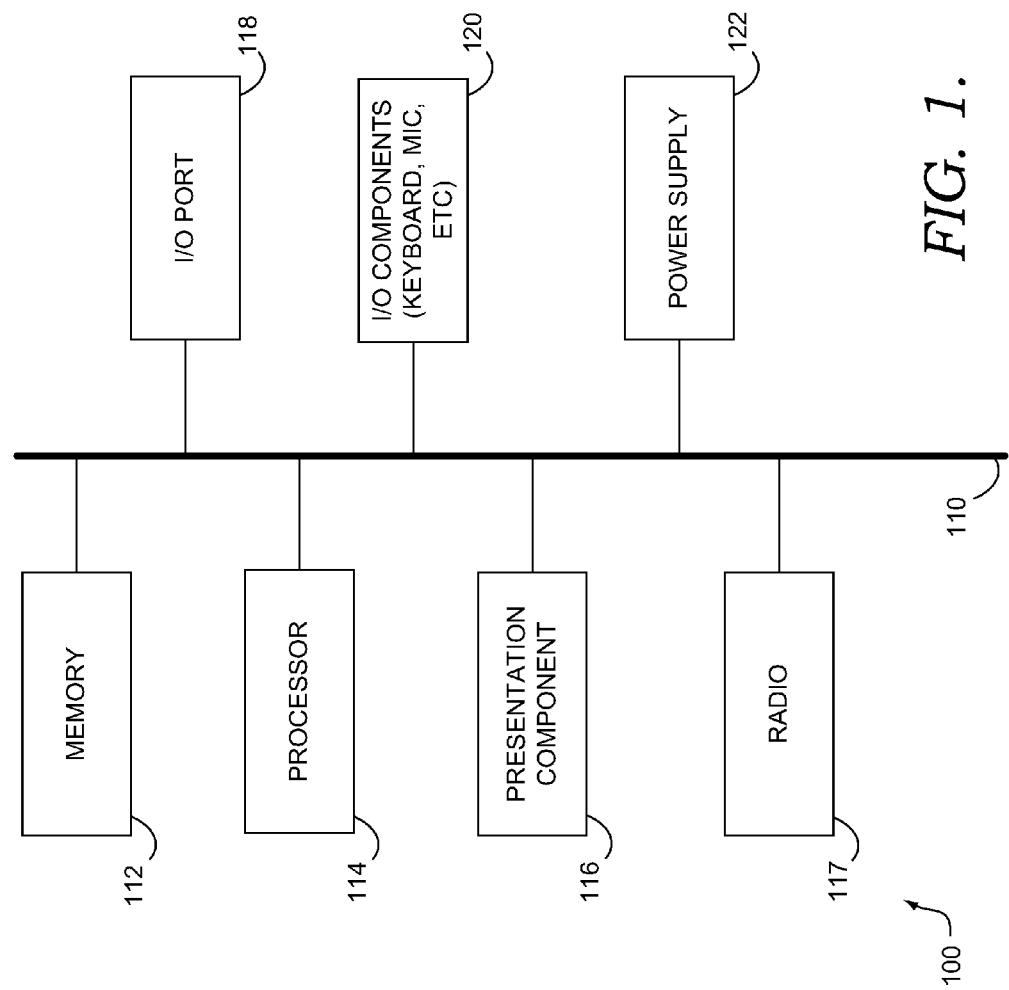
FIG. 1 depicts a diagram of a mobile device in accordance with an embodiment of the present invention.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

A mobile device accesses its network by communicating with its home agent, which is a network element in the mobile device's home network. In client mobile IP, a roaming mobile device establishes a point-to-point protocol (PPP) session with a foreign agent, which is a network element residing in a foreign network to which the mobile device has roamed. On top of that PPP data session, mobile IP signaling occurs, as defined in IETF RFC 3344. The mobile device uses mobile IP signaling to request an IP address from its home agent, via the foreign agent.

In the event that the mobile device lacks mobile IP functionality, proxy mobile IP may be used to provide mobility to the device. Proxy mobile IP moves the IP signaling responsibility off of the mobile device and up into the network. In other words, the mobile device is no longer a participant in the overall mobile IP signaling. The necessary mobile IP signaling (i.e., the request into the network to get an IP address) is done by a network element.

In one scenario, the roaming mobile device communicates with a packet-data serving node (PDSN) in the foreign network. In this scenario, the mobile device establishes a PPP session with the PDSN, but with no mobile IP signaling on top of the PPP session. The mobile device communicates directly with the PDSN, via PPP, and requests an IP address without the additional layer of mobile IP signaling. The PDSN then performs mobile IP signaling with the mobile device's home agent to negotiate a proxy mobile IP session for the device. In another scenario, the roaming mobile device communicates with an access point in the foreign network, the access point communicates with a foreign agent, and the foreign agent performs the mobile IP signaling. In yet another scenario, the access point performs the mobile IP signaling.

One thing that occurs when a session is negotiated, whether in client mobile IP or proxy mobile IP, is that a registration lifetime for the session is established. The registration lifetime determines the duration of the session. For example, if the registration lifetime is set to 60 minutes, then at the end of the 60-minute period, if no action has been taken to reregister the session, the session becomes null or invalid.

In client mobile IP, since the registration lifetime is negotiated between the mobile device, the foreign agent, and the home agent, all three parties (the mobile device, the foreign agent, and the home agent) know the duration of the registration lifetime, and each keeps track of the session time in synchronization with the other two devices. Thus, in this example, at the end of the 60-minute period, all three parties know that the session is null or invalid.

In proxy mobile IP, since the mobile device does not participate in the mobile IP signaling, only the foreign agent and the home agent know the duration of the registration lifetime that has been established. PPP, which is used between the foreign agent and the mobile device (without mobile IP signaling), has no definition for the registration lifetime, nor is there anything analogous to the registration lifetime in PPP, thus PPP does not define a means of communicating the duration of the registration lifetime to the mobile device. Although PPP does define an "inactivity timer," the inactivity timer is reset every time a packet is sent and does not provide the functionality of the lifetime timer.

Figure 2:
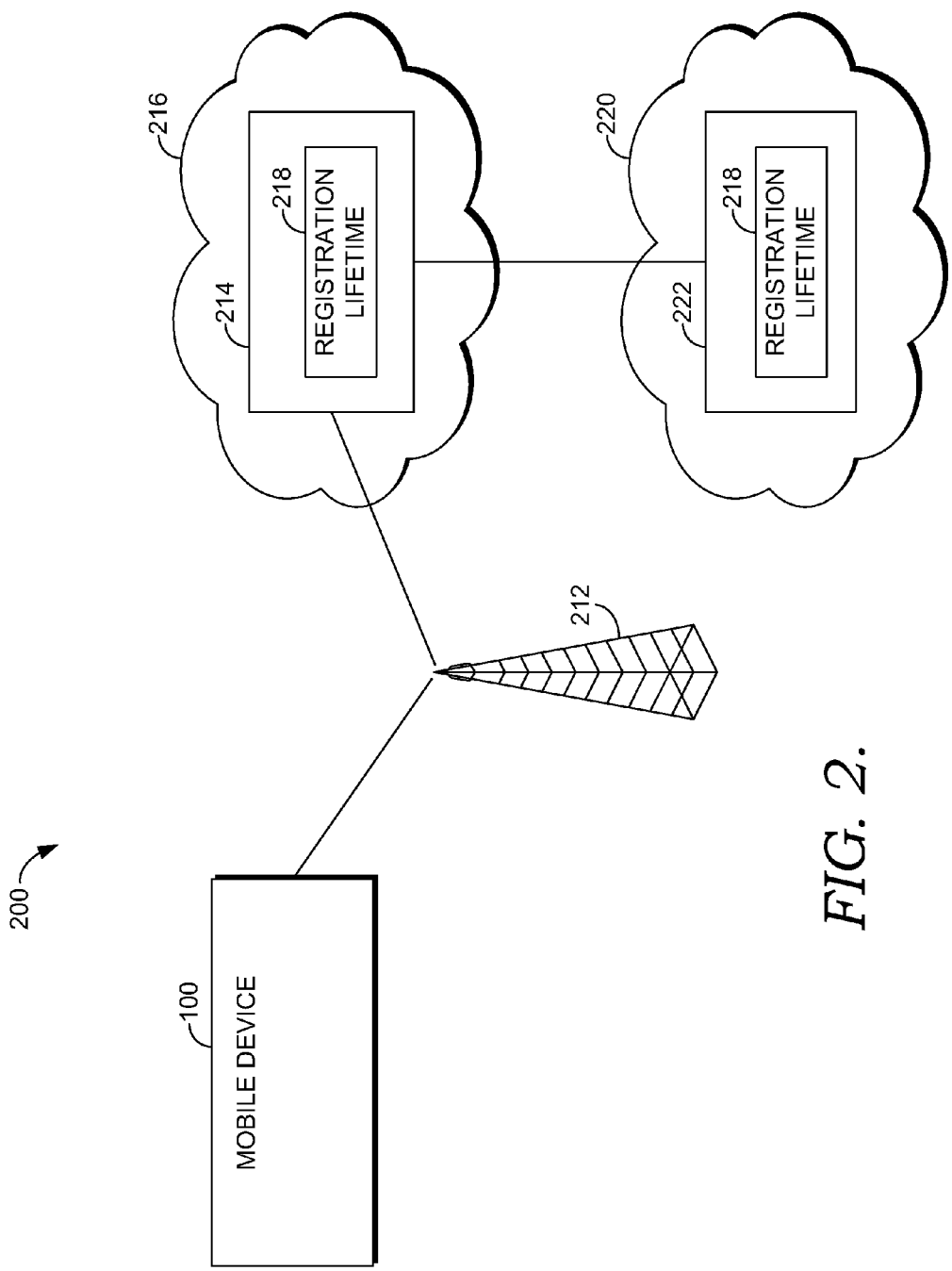
FIG. 2 depicts a network environment suitable for use in accordance with an embodiment of the present invention.

Referring now to FIG. 2, an environment suitable for use in accordance with an embodiment of the present invention is depicted and is generally referred to as network environment 200. Network environment 200 is but one example of a suitable network environment.

A mobile device 100 may be any of a multitude of devices that connect with a communications network while remaining mobile. Examples include, but are not limited to, mobile phones, laptops, PDAs, gaming systems, and electronic books.

An access component 212 is a base station in some embodiments. In other embodiments, access component 212 is an access point, sometimes referred to as a "hotspot" or a wireless router. In these embodiments, the access component 212 may be a combination of an access point and a base station. In an embodiment, access component 212 communicates with roaming mobile device 100 and with a foreign agent 214 residing in a foreign network 216 within which the mobile device 100 is roaming.

In an embodiment, foreign agent 214 participates in the registration process and keeps track of the care-of address of mobile device 100 in foreign network 216, and also keeps track of a registration lifetime 218 for a given mobile IP session for mobile device 100. Foreign agent 214 may be embodied as a single network element, or as a collection of network elements. Exemplary elements that function as foreign agent 214 include, but are not limited to, a router and a packet data serving node (PDSN).

A home network 220 is depicted, and within home network 220 is a home agent 222. Home agent 222 forwards communications intended for mobile device 100 to the care-of address in foreign network 216, and keeps track of registration lifetime 218 for a given session. FIG. 2 will be discussed further with reference to FIG. 3.

Figure 3:
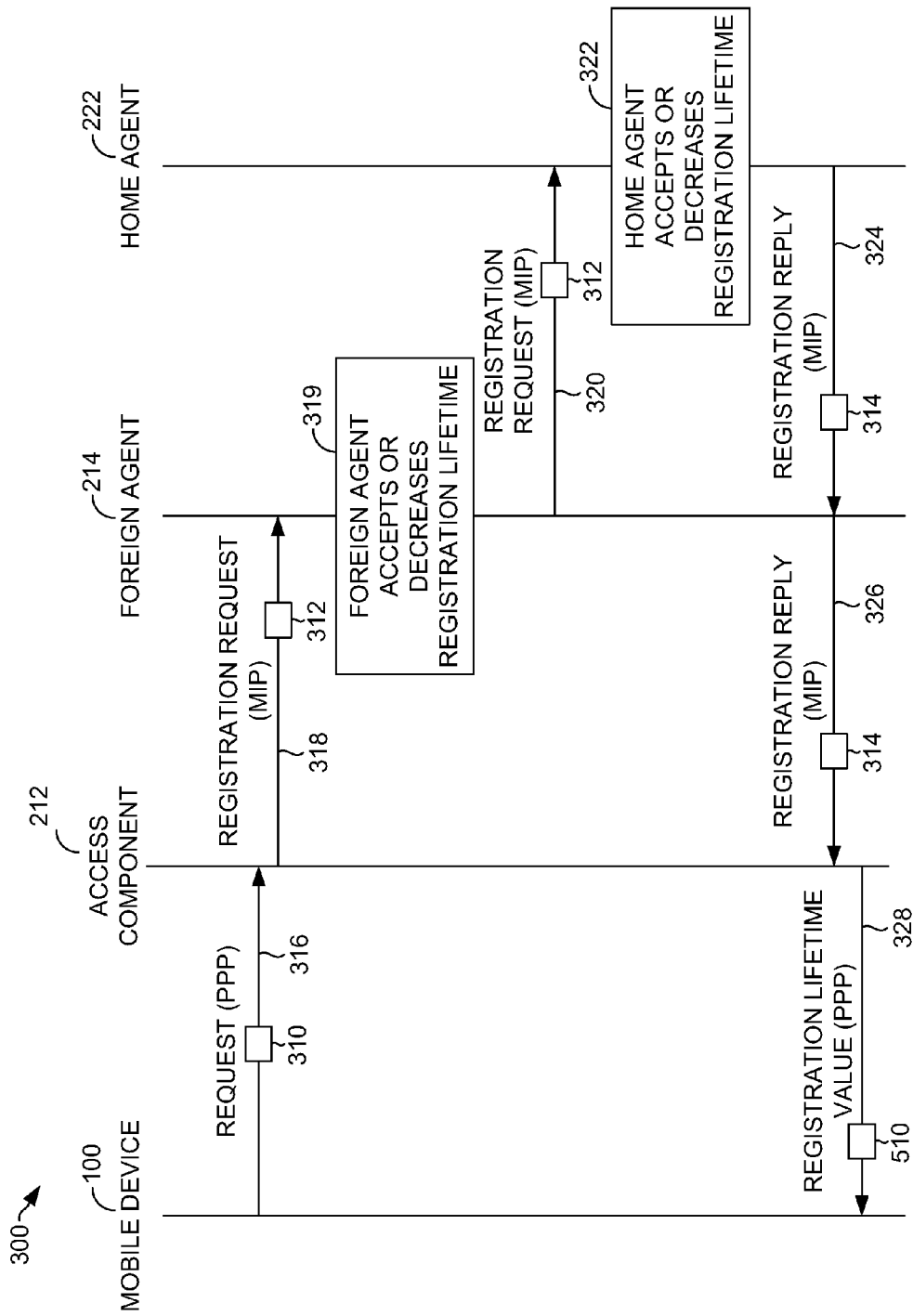
FIG. 3 is a flow diagram depicting a proxy mobile IP registration process for use in accordance with an embodiment of the present invention.

Referring now to FIG. 3, a flow diagram depicts a proxy mobile IP registration process for use in accordance with an embodiment of the present invention, and is generally referred to as registration process 300. FIG. 3 includes mobile device 100 of FIG. 1, and access component 212, foreign agent 214, and home agent 222, all of FIG. 2.

In an embodiment, mobile device 100 communicates with access component 212 in foreign network 216 (of FIG. 2) via a point-to-point protocol (PPP) connection and sends an IP address request 310 to access component 212 at a step 316. Access component 212 performs the mobile IP signaling on behalf of mobile device 100, which includes sending a registration request 312 to foreign agent 214 at a step 318.

Figure 5:
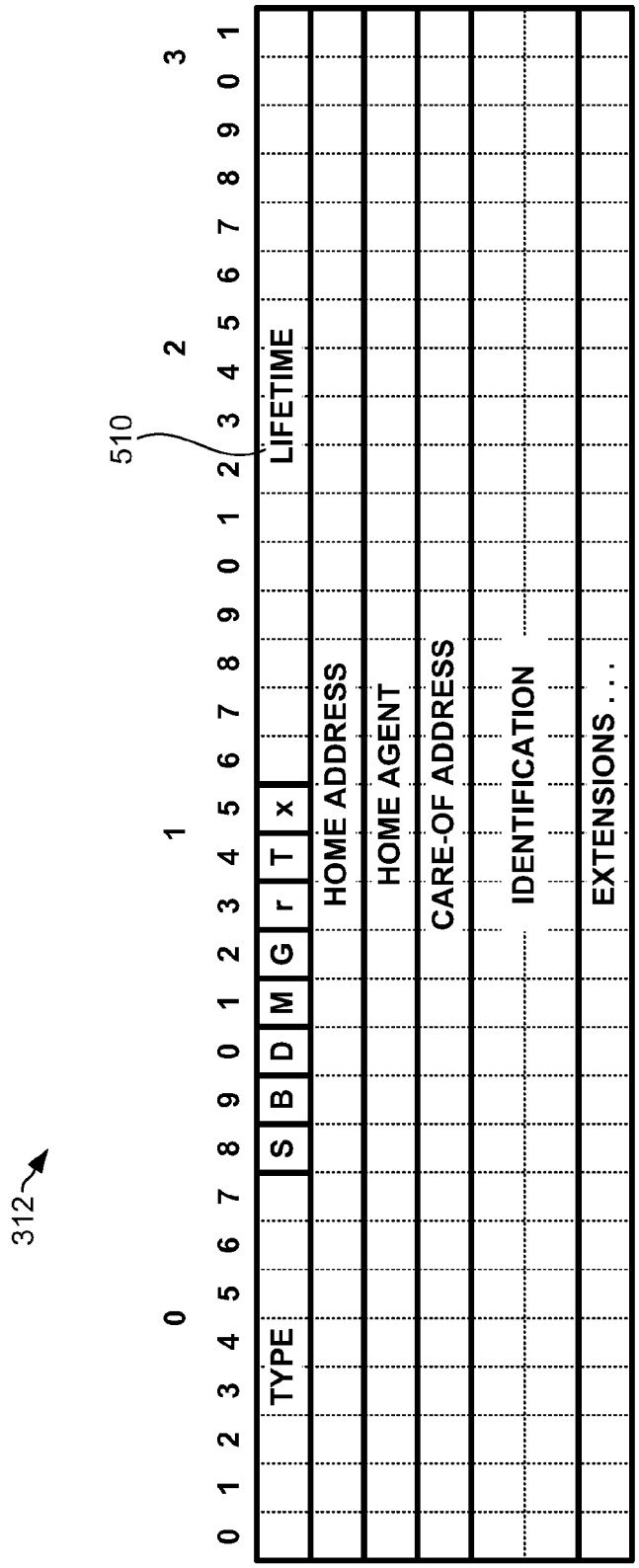
FIG. 5 illustrates a format of a mobile IP registration request message for use in accordance with an embodiment of the present invention.

FIG. 5 illustrates an exemplary registration request 312. Registration request 312 includes a requested value of a registration lifetime 510. Registration lifetime 510 indicates the value that is requested for the registration lifetime of the session, which governs the length, or duration, of the mobile IP session that is established for mobile device 100. When the amount of time indicated by registration lifetime 510 has elapsed, the network session is terminated, unless access component 212 reregisters mobile device 100 before the registration lifetime expires. In an embodiment, registration lifetime 510 is a 16-bit value with the least significant bit equal to one second, where a value of 0xFFFF designates infinity. Thus, 60 minutes is represented by 0xE10 hex, which is equivalent to 3600 seconds.

When foreign agent 214 receives registration request 312 from access component 212, foreign agent 214 may accept the value of registration lifetime 510 received in registration request 312, or may choose to decrease the value of registration lifetime 510, at a step 319. Foreign agent 214 sends registration request 312 to home agent 222 at a step 320.

When home agent 222 receives registration request 312 from foreign agent 214, home agent 222 may accept the value of registration lifetime 510 received in registration request 312, or home agent 222 may choose to decrease the value of registration lifetime 510, at a step 322. In response to registration request 312, home agent 222 sends a registration reply 314, which includes the final value of registration lifetime 510, to foreign agent 214 at a step 324. Foreign agent 214 sends registration reply 314 to access component 212 at a step 326. At that point in time, access component 212, foreign agent 214, and home agent 222 each know the final value of registration lifetime 510, and thus each knows when to terminate the session if mobile device 100 is not reregistered prior to the timing-out of the registration lifetime.

At a step 328, access component 212 communicates registration lifetime 510 to mobile device 100. As described above, PPP does not define a mechanism for communicating the registration lifetime. Access component 212 makes use of a PPP extension that enables vendor-specific (i.e., vendor-defined) packets to be sent via PPP.

Figure 6:
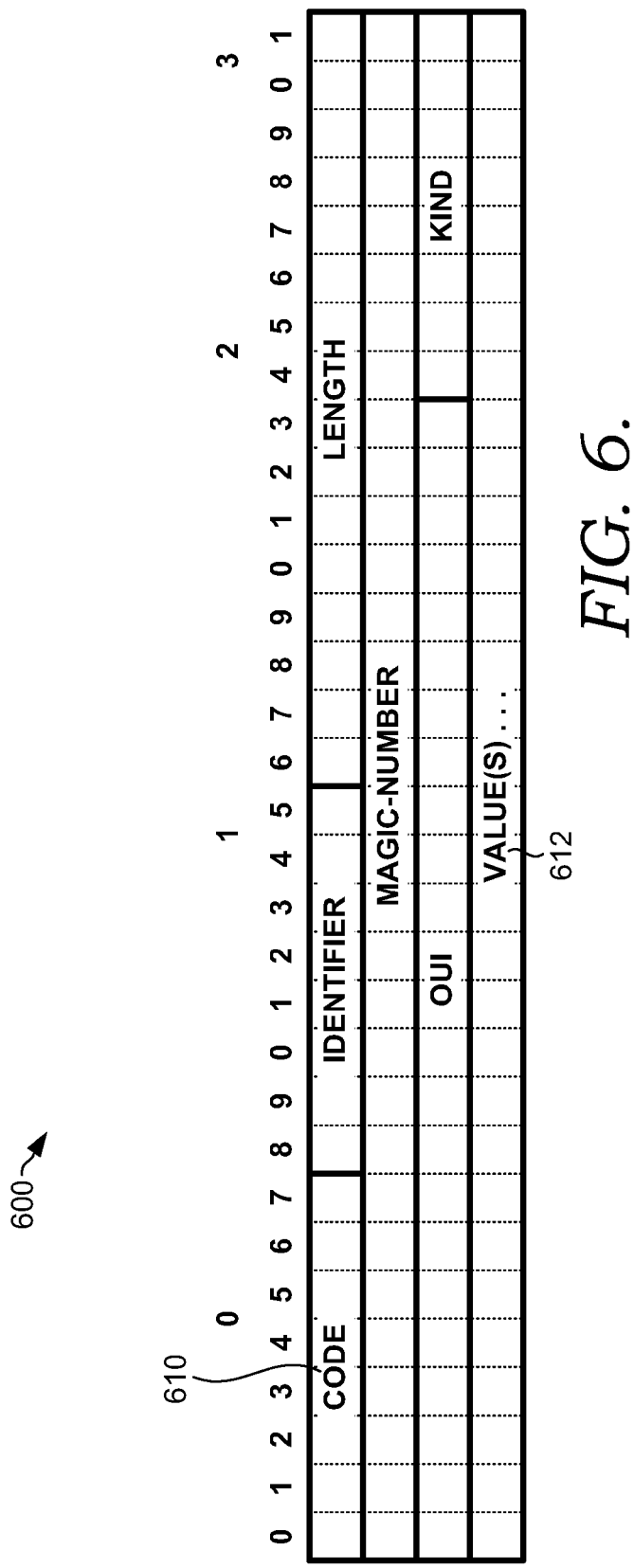
FIG. 6 illustrates a format of a point-to-point protocol vendor-specific packet for use in accordance with an embodiment of the present invention.

FIG. 6 illustrates an exemplary PPP vendor-specific packet format, as defined in IETF RFC 2153, for use in accordance with an embodiment of the present invention, and is generally referred to as vendor-specific packet 600. Vendor-specific packet 600 includes a code field 610 which, when set to a value of zero, identifies a PPP packet as a vendor-specific packet. Vendor-specific packet 600 includes a value field 612 that is used to communicate a vendor-defined value. In an embodiment, registration lifetime 510 is encoded in bits 0-31 of value field 612. In another embodiment, registration lifetime 510 is encoded at a different bit position within value field 612, or in a different format.

Thus, at step 328, the registration lifetime 510 is communicated to mobile device 100 over the PPP connection by way of vendor-specific packet 600, in which code field 610 is set to zero, and value field 612 contains the registration lifetime 510. Accordingly, mobile device 100 then knows the value of registration lifetime 510.

Figure 4:
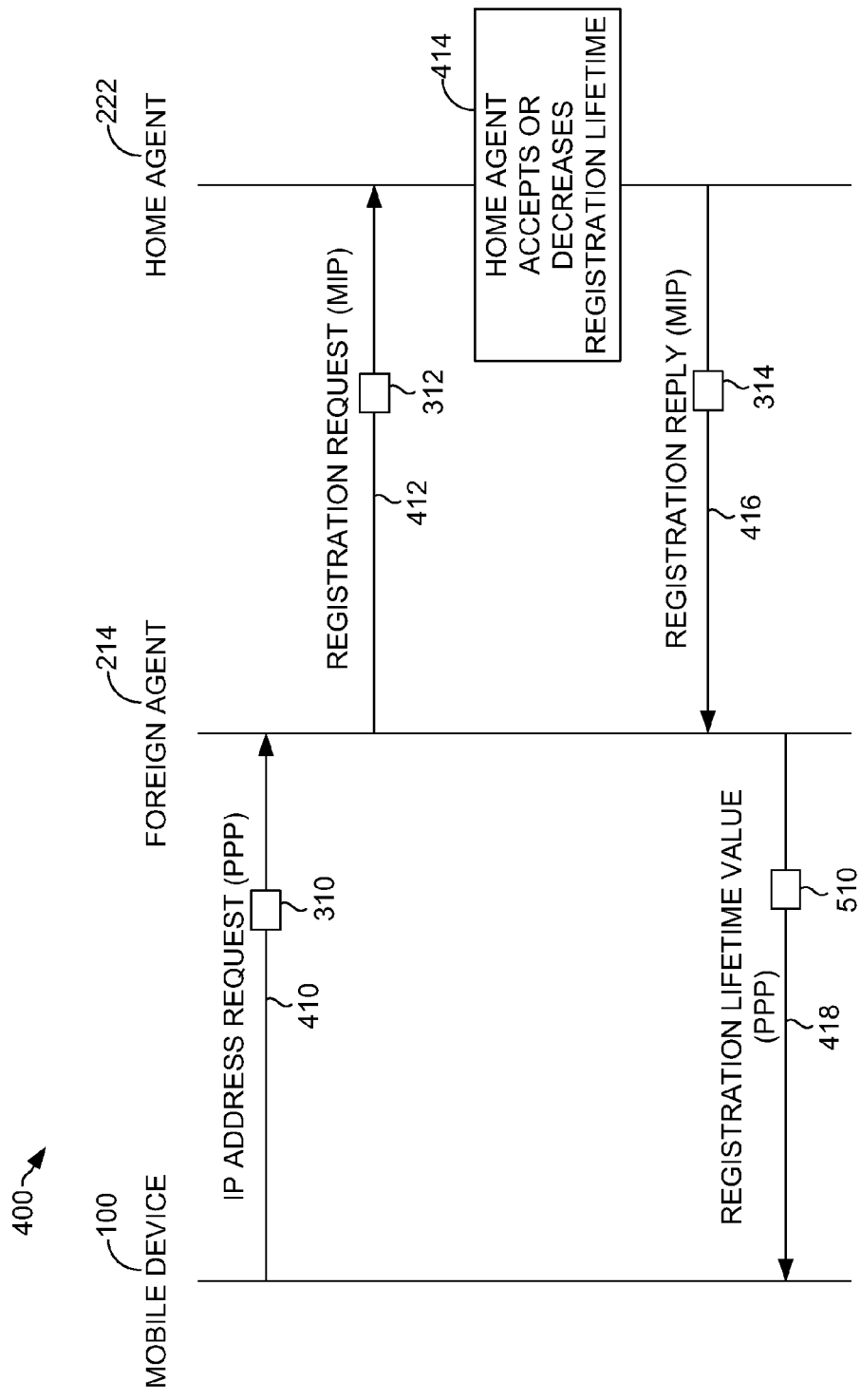
FIG. 4 is a flow diagram depicting a proxy mobile IP registration process for use in accordance with an embodiment of the present invention.

Referring now to FIG. 4, a flow diagram depicts a proxy mobile IP registration process for use in accordance with an embodiment of the present invention, and is generally referred to as registration process 400. FIG. 4 includes mobile device 100 of FIG. 1, foreign agent 214 and home agent 222, of FIG. 2, IP address request 310, registration request 312, and registration reply 314 of FIG. 3, and registration lifetime 510 of FIG. 5.

In an embodiment, mobile device 100 communicates with foreign agent 214 in foreign network 216 (of FIG. 2) via a PPP connection and sends an IP address request 310 to foreign agent 214 at a step 410. In an embodiment, foreign agent 214 is a packet-data-serving node (PDSN). Foreign agent 214 performs the mobile IP signaling on behalf of mobile device 100, which includes sending a registration request 312 to home agent 222 at a step 412. As described above, registration request 312 includes a requested value of a registration lifetime 510.

When home agent 222 receives registration request 312 from foreign agent 214, home agent 222 may accept the value of registration lifetime 510 received in registration request 312, or home agent 222 may choose to decrease the value of registration lifetime 510, at a step 414. In response to registration request 312, home agent 222 sends a registration reply 314, which includes the final value of registration lifetime 510, to foreign agent 214 at a step 416. Thus, at that point, foreign agent 214 and home agent 222 each know the final value of registration lifetime 510, and thus each knows when to terminate the session if mobile device 100 is not reregistered prior to the timing-out of the registration lifetime.

At a step 418, foreign agent 214 communicates registration lifetime 510 to mobile device 100 over the PPP connection. Foreign agent 214 makes use of the PPP extension enabling vendor-specific packets to be sent via PPP, as described above. Accordingly, mobile device 100 then knows the value of registration lifetime 510.

Referring now to FIG. 7, a method for use in accordance with an embodiment of the present invention is depicted in a flowchart, and is generally referred to as method 700. At a step 710, a request is sent from a mobile device, which is in a foreign network, to register with the mobile device's home agent. The request, which includes a request of an IP address, is sent to a network element in the foreign network, and is communicated using PPP, but without using mobile IP protocol. The request initiates a proxy mobile IP session that is negotiated on behalf of the mobile device by the network element. In an embodiment, the network element is a PDSN.

The PDSN performs mobile IP signaling, over a PPP connection, with the home agent and sends a mobile IP registration request to the home agent. The registration request includes a value for the registration lifetime selected by the PDSN. When the home agent receives the registration request, it may either accept the value of the registration lifetime, or may set it to a lesser value. The PDSN and the home agent thus establish the value of the registration lifetime for the session. In either case, the home agent returns a registration reply to the PDSN with the resultant value of the registration lifetime.

The PDSN receives the registration reply from the home agent and communicates the value of the registration lifetime to the mobile device. Because the PPP connection between the PDSN and the mobile device does not utilize the mobile IP protocol, the PDSN makes use of the vendor-specific extension to the PPP specification to communicate the value of the registration lifetime to the mobile device.

At a step 712, the mobile device receives the value of the registration lifetime from the PDSN. The registration lifetime is received in a PPP packet that has the code field set to zero, which indicates that the packet is a vendor-specific packet containing vendor-defined data, as described above. The mobile device interprets data in the value field of the vendor-specific packet as the registration lifetime.

Referring now to FIG. 8, a method for use in accordance with an embodiment of the present invention is depicted in a flowchart, and is generally referred to as method 800. At a step 810, a foreign agent receives a registration request, via PPP, from a mobile device (that is not mobile-IP enabled) to register with the mobile device's home agent. In an embodiment, a foreign agent is a network element that resides in the foreign network in which the mobile device is currently located. An exemplary foreign agent is a PDSN.

At a step 812, the foreign agent communicates with the home agent via a PPP connection. The foreign agent employs mobile IP signaling over the PPP connection and, at a step 814, the foreign agent utilizes mobile IP signaling to negotiate a proxy mobile IP session with the home agent on behalf of the mobile device.

At a step 816, the foreign agent establishes a registration lifetime with the home agent by sending a mobile IP registration request to the home agent, including a requested value for the registration lifetime. The home agent returns a registration reply to the foreign agent with either the requested value of the registration lifetime, or with a lesser value selected by the home agent.

At a step 818, the foreign agent communicates the value of the registration lifetime to the mobile device via the PPP connection. Since the mobile device is not mobile-IP enabled, mobile IP signaling cannot be used to communicate the registration lifetime. The foreign agent generates a vendor-specific PPP packet that includes an indication of the value of the registration lifetime, and sends the packet to the mobile device.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more nontransitory computer-readable media having computer-executable instructions embodied thereon that, when executed, perform a method of facilitating communication of a registration lifetime value to a mobile device for a proxy mobile Internet Protocol ("IP") session, the method comprising:

sending, from the mobile device, a request to register with a home agent associated with the mobile device, wherein the request initiates the proxy mobile IP session, wherein a network element utilizes a mobile IP protocol to negotiate the proxy mobile IP session with the home agent on behalf of the mobile device, wherein the mobile IP protocol is communicated over a point-to-point protocol (PPP) connection and wherein the network element and the home agent establish the value of the registration lifetime; and receiving, at the mobile device, the value of the registration lifetime from the network element, wherein the mobile device communicates with the network element utilizing PPP without utilizing the mobile IP protocol, wherein receiving the value of the registration lifetime includes receiving a PPP packet from the network element, wherein the PPP packet includes a code-field value of zero that allows for vendor-defined content to be included in the PPP packet, and wherein the vendor-defined content includes the indication of the value of the registration lifetime, and wherein the value indicates a duration of the proxy mobile IP session.

2. The media of claim 1, wherein the mobile device recognizes the code-field value of zero and interprets the vendor-defined content as the value of the registration lifetime.

3. One or more nontransitory computer-readable media having computer-executable instructions embodied thereon that, when executed, facilitate a method of communicating a value of a registration lifetime for a proxy mobile IP session to a mobile device, the method comprising:

receiving a request from the mobile device to register with a home agent associated with the mobile device;

communicating the request to the home agent;

negotiating the proxy mobile IP session with the home agent on behalf of the mobile device;

establishing the registration lifetime with the home agent, wherein establishing the registration lifetime includes determining the value of the registration lifetime; and communicating the value of the registration lifetime to the mobile device, wherein communicating the value of the registration lifetime to the mobile device includes, A) generating a point-to-point protocol (PPP) packet that includes a code-field value of zero that allows for vendor-defined content to be included in the PPP packet, and wherein the vendor-defined content includes an indication of the value of the registration lifetime, and B) sending the PPP packet to the mobile device.

4. The media of claim 3, wherein establishing the registration lifetime with the home agent includes receiving the value of the registration lifetime from the home agent, via mobile IP signaling.

5. The media of claim 3, wherein a network element negotiates the proxy mobile IP session with the home agent.

6. The media of claim 5, wherein negotiating the proxy mobile IP session includes utilizing mobile IP signaling between the network element and the home agent, and wherein the mobile IP signaling is carried over a point-to-point protocol (PPP) session.

7. The media of claim 6, wherein the mobile device is unaware of the mobile IP signaling between the network element and the home agent.

8. The media of claim 5, wherein the network element is a foreign agent.

9. The media of claim 5, wherein the network element is a packet data serving node (PDSN).

* * * * *